United States Patent
Nunez et al.

(10) Patent No.: US 9,763,193 B2
(45) Date of Patent: Sep. 12, 2017

(54) BATTERY LIFE EXTENSION FOR A COMMUNICATION DEVICE

(71) Applicant: MOTOROLA SOLUTIONS, INC, Schaumburg, IL (US)

(72) Inventors: Diego I. Nunez, Southwest Ranches, FL (US); Javier Alfaro, Miami, FL (US); Chun P. Leung, Jacksonville, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/743,251

(22) Filed: Jun. 18, 2015

(65) Prior Publication Data
US 2016/0374024 A1    Dec. 22, 2016

(51) Int. Cl.
*H04W 52/02* (2009.01)

(52) U.S. Cl.
CPC ..... *H04W 52/0251* (2013.01); *H04W 52/029* (2013.01); *H04W 52/0254* (2013.01)

(58) Field of Classification Search
CPC ......... H04W 52/0251; H04W 52/0254; H04W 52/029; H04M 1/72527
USPC .......... 455/557, 559, 572, 573, 574
See application file for complete search history.

(56) References Cited

U.S. PATENT DOCUMENTS

| | | | |
|---|---|---|---|
| 6,009,309 A | 12/1999 | Okada et al. | |
| 6,653,816 B2 * | 11/2003 | Peek | H02J 1/14 320/132 |
| 7,146,187 B2 | 12/2006 | Richards et al. | |
| 7,424,312 B2 | 9/2008 | Pinder et al. | |
| 2004/0203510 A1 | 10/2004 | Claxton et al. | |
| 2005/0075133 A1 * | 4/2005 | Pinder | H04M 1/72527 455/557 |
| 2008/0224663 A1 * | 9/2008 | Mack | B60K 6/445 320/132 |

(Continued)

FOREIGN PATENT DOCUMENTS

| | | |
|---|---|---|
| WO | 2005031986 A2 | 4/2005 |
| WO | 2005125165 A2 | 12/2005 |

OTHER PUBLICATIONS

The International Search Report and the Written Opinion, SN: PCT/US2016/037130, filed Jun. 13, 2016, mailed: Oct. 7, 2016, all pages.

*Primary Examiner* — Christopher M Brandt

(57) ABSTRACT

Systems (100) and methods (400) for extending battery life on a Communication Device ("CD"). The methods involve: configuring operations of CD and an accessory such that they operate in a first operational mode in which the accessory has a first functionality; and detecting the occurrence of a trigger event. The trigger event occurs when: (a) CD's power source has a State-Of-Charge ("SOC"), capacity or voltage level that is not optimal for powering the accessory, (b) a voltage level of the accessory's power source is below a lowest voltage level at which the accessory can fully operate, or (c) a power source of the accessory is sufficiently charged/re-charged such that the accessory can once again operate in the SOM. In response to the trigger event, operations of CD and accessory are re-configured such that they operate in accordance with a second operational mode in which the accessory has a second functionality.

20 Claims, 11 Drawing Sheets

(56) References Cited

U.S. PATENT DOCUMENTS

| | | | |
|---|---|---|---|
| 2009/0200982 A1* | 8/2009 | Hurtz | G06F 1/3203 320/103 |
| 2009/0253469 A1 | 10/2009 | Herezong | |
| 2011/0009172 A1* | 1/2011 | Song | H04M 1/72544 455/573 |
| 2011/0185048 A1 | 7/2011 | Yew et al. | |
| 2011/0202220 A1* | 8/2011 | Seta | B60L 1/00 701/22 |
| 2013/0159559 A1* | 6/2013 | Hess | G06F 13/385 710/14 |
| 2013/0336506 A1 | 12/2013 | Prentice | |
| 2014/0155004 A1* | 6/2014 | Torstensson | H04B 1/40 455/90.3 |
| 2014/0223037 A1* | 8/2014 | Minoo | G06F 1/1632 710/16 |
| 2016/0134157 A1* | 5/2016 | Maeno | H02J 7/007 320/101 |
| 2016/0190840 A1* | 6/2016 | Rich | G06F 1/1632 320/106 |

\* cited by examiner

BATTERY LIFE EXTENSION FOR A COMMUNICATION DEVICE

BACKGROUND OF THE INVENTION

Battery life is the amount of time a battery-powered device (e.g., a portable communication device) operates before its battery needs to be recharged or replaced. Due to the growing dependence on battery-powered devices, battery life has become an important customer requirement and product differentiator. Recently, efforts to improve battery life have included gathering data from different battery modules of the portable communication device (e.g., a two-way radio, a mobile telephone and the like). This allows the portable communication device to make intelligent decisions based on battery information, providing a more sophisticated battery management system for the portable communication device.

Many portable communication devices today are utilized in conjunction with different types of accessories of different complexities. The accessories include simple (or passive) accessories, smart (or active) accessories, and battery powered accessories. A simple accessory comprises a passive accessory with audio capabilities (e.g., a remote speaker, a remote microphone and/or a remote Push-To-Talk ("PTT") button) and/or emergency/user interface indications. The simple accessory does not require power from the portable communication device, but may require audio configuration from the portable communication device (e.g., specific filtering, amplification, etc.). A smart accessory comprises an active accessory with a processor, a data bus and an audio component. The smart accessory may include a display and be capable of performing audio and/or video processing. The electronic components of the smart accessory are powered by the portable communication device. A battery powered accessory comprises an accessory with electronic components (e.g., a touch screen, a camera, and/or a wireless transceiver) in addition to an audio component, a processor and a data bus. The battery powered accessory may have all the features of a smart accessory or may be a collaborative device that can operate in a stand-alone fashion.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
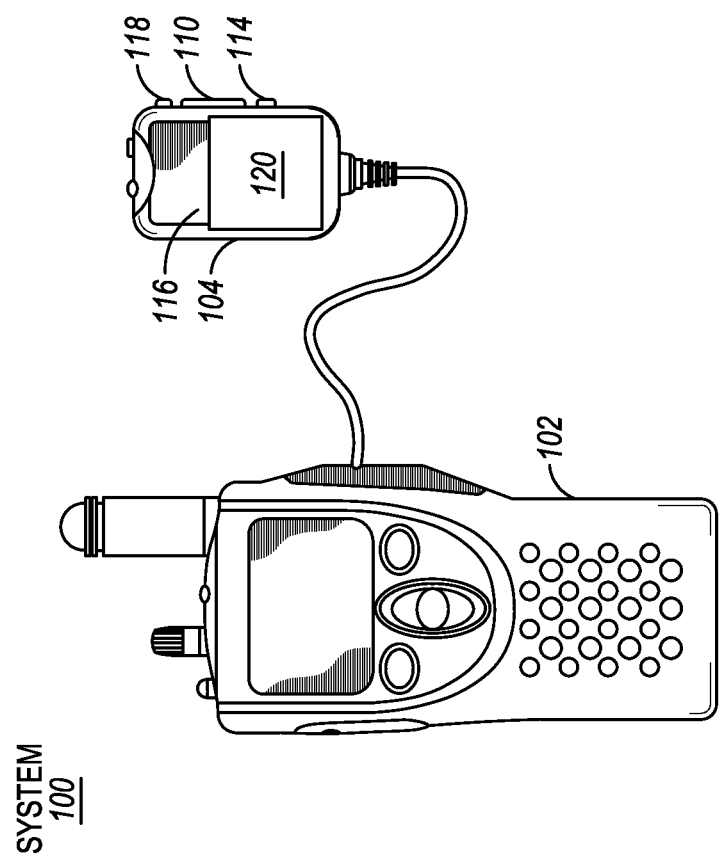
FIG. 1 is an illustration of an exemplary portable communication device with an accessory.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure concerns systems and methods to extend battery life on a portable communication device operating in conjunction with an accessory. The systems and methods are generally configured to: (a) improve a portable communication device's battery life by making smarter decisions on the way the portable communication device interacts with accessory devices; (b) extend battery life of the portable communication device while maintaining mission-critical functions thereof (e.g., talk, listen and/or emergency communications); (c) allow a smart accessory to perform mission critical functions when it is not powered by the portable communication device; (d) allow a smart accessory to perform mission critical functions with a depleted battery or even without a battery; (e) allow a power source of an accessory to be charged by the main battery of the portable communication device while prioritizing the main battery's life; and/or use a common algorithm for achieving (a)-(e) that encompasses all the different types of accessories. Accordingly, the implementation of the systems and methods bring power savings and, at the same time, make mission critical features of the portable communication device and accessories more reliable for customers in vary unfavorable battery capacity scenarios.

The methods generally involve: obtaining, by a portable communication device, an accessory identifier from an accessory's internal memory in response to the detection that the accessory has been coupled to the portable communication device. The accessory identifier indicates a first device configuration of the accessory in a first operational mode (e.g., an active operational mode or a battery powered operational mode) in which the accessory has at least a first amount of functionality (e.g., performs operations so as to be fully functional) and a second device configuration of the accessory in a second operational mode (e.g., a passive operational mode or a simple battery powered operational mode) in which the accessory has at least a second amount of functionality (e.g., performs only some of the operations so as to be partly functional or have limited functionality). The first amount of functionality is different than the second amount of functionality. Thereafter, operations of the communication device are configured such that it works collaboratively and/or in conjunction with the accessory that is in its first operational mode (or is fully functional).

Subsequently, the occurrence of a trigger event is detected for triggering a transition of the accessory's operational mode from the first operational mode to the second operational mode. The trigger event occurs, for example, when: (a) a power source of the portable communication device has a State-Of-Charge ("SOC"), capacity or voltage level that is outside a predetermined optimal range for powering the accessory; (b) a voltage level of the accessory's power source is below a lowest voltage level or value at which the accessory can fully operate; or (c) a power source of the accessory has an SOC, capacity or voltage level above a predetermined level or value that is sufficient for enabling the accessory to once again operate in the second operational mode (e.g., a battery powered operational mode). In response to the trigger event, operations of the portable communication device and accessory are re-configured in accordance with the second operational mode (e.g., so that the portable communication device works collaboratively and/or in conjunction with the accessory that is partly functional or have limited functionality).

The above-described methods are applicable in a plurality of different low battery scenarios. These scenarios include, but are not limited to, smart accessory scenarios and battery-powered accessory scenarios. Each of these scenarios will be addressed separately below in relation to a two-way radio based portable communication device. The present invention is not limited in this regard. The portable communication device can alternatively include, but is not limited to, a mobile telephone (e.g., a cellular telephone device), a portable computing device (e.g., a tablet device), and/or a telephone watch device.

In certain smart accessory scenarios, a public safety individual utilizes a portable radio coupled to a noise cancellation smart Remote Speaker Microphone ("RSM"). In the event that the battery of the portable radio is depleted or near depletion, it is desirable to incorporate power savings mechanisms to extend the portable radio's battery life, while retaining mission-critical functions which require the operation of at least a portion of the RSM.

In certain battery powered accessory scenarios, a public safety individual utilizes a portable radio coupled to a battery powered collaborative accessory. Conventionally, in the event that the battery of the collaborative accessory is depleted or near depletion, the accessory will not operate and the public safety individual will instead use the portable radio for functions proved by the accessory such as talking, listening and emergency functions. In contrast, the collaborative accessory described herein will still have mission critical functionality while the battery is depleted or even non-existent. A mechanism to smartly charge the accessory is also disclosed herein.

Exemplary Portable Communication Device with an Accessory

Referring now to FIG. 1, there is provided a schematic illustration of an exemplary system 100 including a portable communication device 102 with an accessory 104. The portable communication device 102 comprises a two-way radio, while the accessory 104 comprises an external microphone accessory. It will be appreciated that the two-way radio and external microphone accessory are for illustrative purpose only and that the system can be implemented using an equivalent portable communication device and/or accessory. Two-way radios are well known in the art, and therefore will not be described herein. It should be understood that the two-way radio is configured to transmit and receive signals. The two-way radio allows an operator thereof to have a conversation with other similar two-way radios operating on the same radio frequency (or channel).

Notably, the accessory 104 is coupled to the portable communication device 102 via a General Purpose Input/Output ("GPIO") interface (not shown in FIG. 1) or a data bus (not shown in FIG. 1). GPIO interfaces are well known in the art. The GPIO interface comprises a plurality of GPIO pins. Each of the GIPO pins is software programmable to function as either an input pin or an output pin. At least one GPIO pin is programmed to detect when the accessory 104 is coupled to the portable communication device 102. Such detection is made when the GPIO pin is grounded.

Upon power-up of the portable communication device 102, the GPIO pins are programmed in accordance with a default configuration so that all GIPO pins function as input pins. The portable communication device 102 periodically performs operations to detect when the accessory 104 is coupled thereto. When the accessory 104 is detected, the portable communication device 102 obtains accessory configuration data from its internal memory (not shown in FIG. 1) and/or an embedded memory (not shown in FIG. 1) of the accessory 104. The portable communication device 102 then performs operations to configure the GPIO interface and its own operations in accordance with the accessory configuration data. For example, a first GPIO pin is configured to function as an input pin, while a second GPIO pin is configured to function as an output pin. Thereafter, the portable communication device and accessory can be properly collaboratively operated or work in conjunction with each other as specified in the accessory configuration data.

In some scenarios, the accessory 104 comprises a simple (or passive) accessory. The simple (or passive) accessory includes an audio component 116, a PTT button 110, and/or a telephone button 114. The audio component 116 comprises a microphone and a speaker. The PTT button is generally operative to facilitate the initiation and performance of PTT operations. PTT operations include, but are not limited to, providing a two-way communication service that uses half-duplex mode in which transmission occurs in both directions but not at the same time. Thus, the PTT button enables switching a transceiver's mode from a voice reception mode to a voice transmit mode. The phone button 114 enables a user-software interaction for starting and ending a telephone call. The simple accessory does not require power from the portable communication device 102 to operate, but does need to be connected to the PCD. However, the simple accessory may require audio configuration from the portable communication device (e.g., specific filtering, amplitudes, etc.).

In other scenarios, the accessory 104 comprises a smart accessory. The smart accessory includes an optional touch-screen display 120, a processor (not shown in FIG. 1), a data bus (not shown in FIG. 1), an audio component 116, a PTT button 110, a phone button 114, audio/video processing circuitry, and/or an optional emergency button 118. The emergency button 118 is programmed to facilitate the initiation of emergency operations. Emergency operations include, but are not limited to, issuing and transmitting an emergency signal from the portable communication device in response to depression of the emergency button. The smart accessory does require power from the portable communication device 100 to be fully functional.

In yet other scenarios, the accessory 104 comprises a battery powered accessory. The battery powered accessory includes a battery (not shown in FIG. 1), an optional touch-screen display 120, a processor (not shown in FIG. 1), a data bus (not shown in FIG. 1), an audio component 116, a PTT button 110, a phone button 114, a Light Emitting Diode ("LED"), audio/video processing circuitry, an emergency button 118, and/or sensors (not shown in FIG. 1). The LED may include a status indicator for indicating the operational mode that the accessory is currently in. The sensors may detect an emergency condition in a surrounding environment (e.g., a fire or physical impairment of a person). The battery powered accessory does not require power from the portable communication device 102 to be fully functional.

Simple Accessory Scenarios

In the simple accessory scenarios, the portable communication device simply configures its operations so that it works in conjunction with the simple accessory. The configuration is performed in response to the detection that the simple accessory is coupled thereto. Such detection is achieved by forcing a GPIO pin to ground.

Smart Accessory Scenarios

Figure 2:
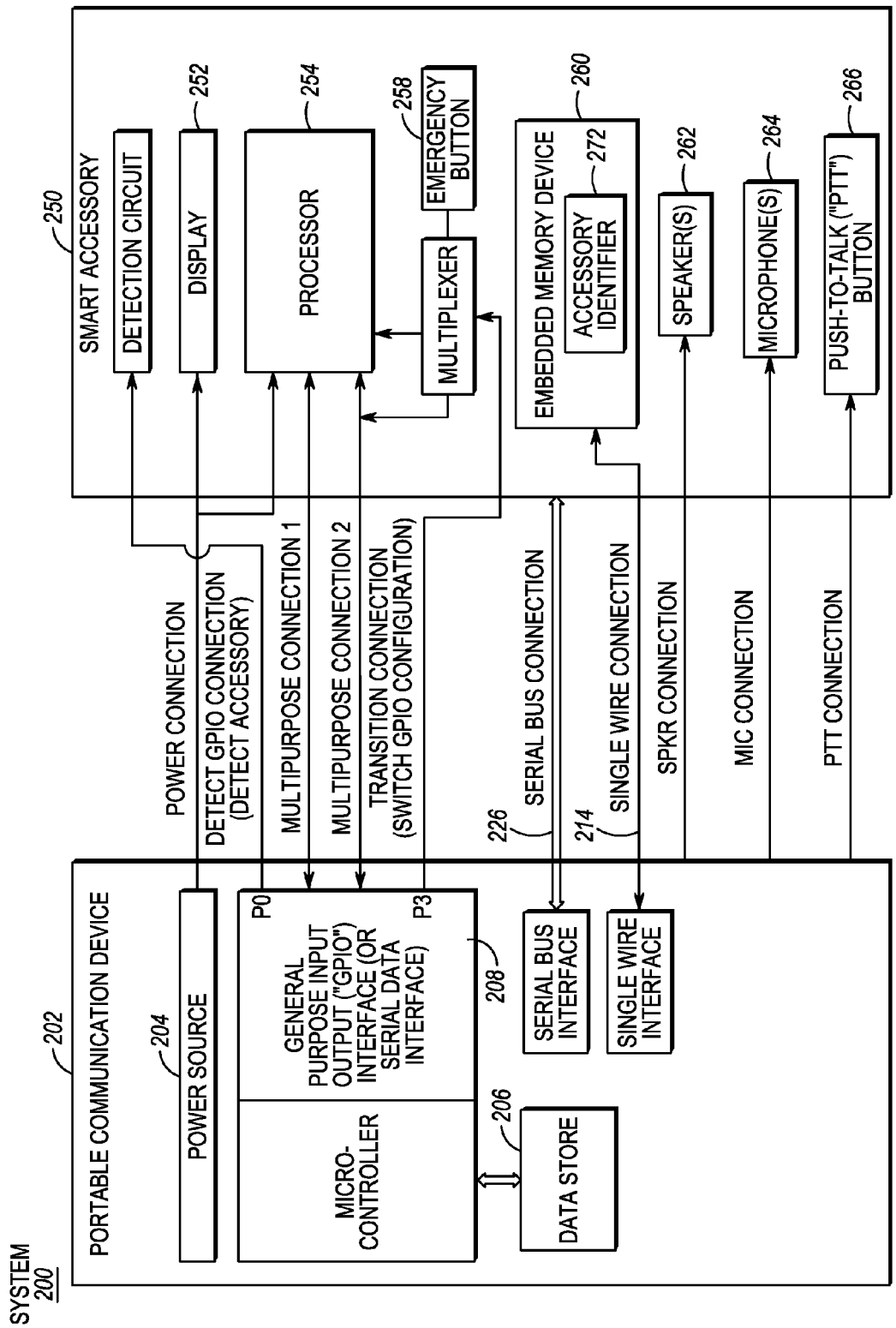
FIG. 2 is an illustration of an exemplary system including a portable communication device and a smart accessory.

Referring now to FIG. 2, there is provided a schematic illustration of an exemplary system 200. System 200 comprises a portable communication device 202 and a smart (or active) accessory 250. Portable communication device 202 can be the same as or similar to the portable communication device 102 of FIG. 1. As such, the discussion provided above in relation to the portable communication device 102 is sufficient for understanding certain operations of the device 202. Device 202 will be described in more detail below.

The smart accessory 250 operates using power provided by the portable communication device 202 to provide power needed by its electronic components 252 through 266. The power is supplied from the portable communication device 202 to the smart accessory 250 via a power connection (e.g., a VBus). In order to extend the battery life of the portable communication device 202, the smart accessory 250 can transition from an active operational mode to a passive operational mode when the charge or capacity of the portable communication device's power source 204 reaches a pre-defined threshold value. In some scenarios, a message may be displayed on the display 252 indicating that the smart accessory 250 is operating in a passive operational mode. Also, certain accessory functions can be transferred to the portable communication device 202. The accessory functions include, but are not limited to, audio processing, sensor handling, and user interface operations.

Notably, the pre-defined threshold value may be different for different types of smart accessories based on the average and peak currents utilized by the smart accessories. The pre-defined threshold values are selected such that the smart accessory's mode is switched to the passive operational mode before the additional transmit current of the portable communication device creates a transmit inhibit condition.

In the passive operational mode, the smart accessory 250 maintains talk, listen and emergency capabilities without pulling power from the power connection. As such, the emergency button 258 is functional by switching emergency signaling from a Serial Bus ("SB") connection 226 to a multipurpose connection 1 or 2 connection facilitated by the GPIO interface 208. Interface 208 can also comprises a serial data interface. The microphone 264 is switched to a single microphone in the case that two or more microphones are employed for noise suppression. One of the microphones could be routed to the portable communication device. The speaker 262 is switched to a single speaker in the case that there are two or more speakers. The transition from the active operational mode to the passive operational mode is outlined by the following TABLE 1.

TABLE 1

| Smart Accessory's Mission Critical Functions In Active Operational Mode | Transition To | Smart Accessory's Mission Critical Functions In Passive Operational Mode |
|---|---|---|
| Talk → Microphone(s) P/N | | Talk → Microphone(s) P/N |
| Listen → Speaker(s) P/N | | Listen → Speaker(s) P/N |
| Emergency → SB Connection | | Emergency → GPIO Connection |

In some scenarios, an operator can disable the mode transitioning via a menu and/or configuration software of the portable communication device.

As shown in FIG. 2, the smart accessory 250 comprises an embedded memory device 260. An accessory identifier 272 is stored in the embedded memory device 260. The accessory identifier 272 provides a means to indicate a particular type of smart accessory to the portable communication device 202. The accessory identifier 272 may include a combined identifier containing information about a corresponding simple version of the particular type of smart accessory. For example, the portable communication device 202 reads a type of smart accessory that has a speaker 262 requiring a specific frequency response and amplitude to enhance audio performance. The smart version of the identifier includes that information along with configuration settings for the processor 254 and display 252. Once the portable communication device 202 determines that power needs to be suppressed to the smart accessory 250, the portable communication device configures itself for simple accessory operation maintaining the same frequency response and amplitude adjustments for the accessory speaker 262. Basically, any smart accessory identifier could have a corresponding simple accessory identifier that can be either stored on the accessory or deduced from the portable communication device given a particular type of smart accessory. These parameters could also be passed from the accessory before the transition.

Figure 3A:
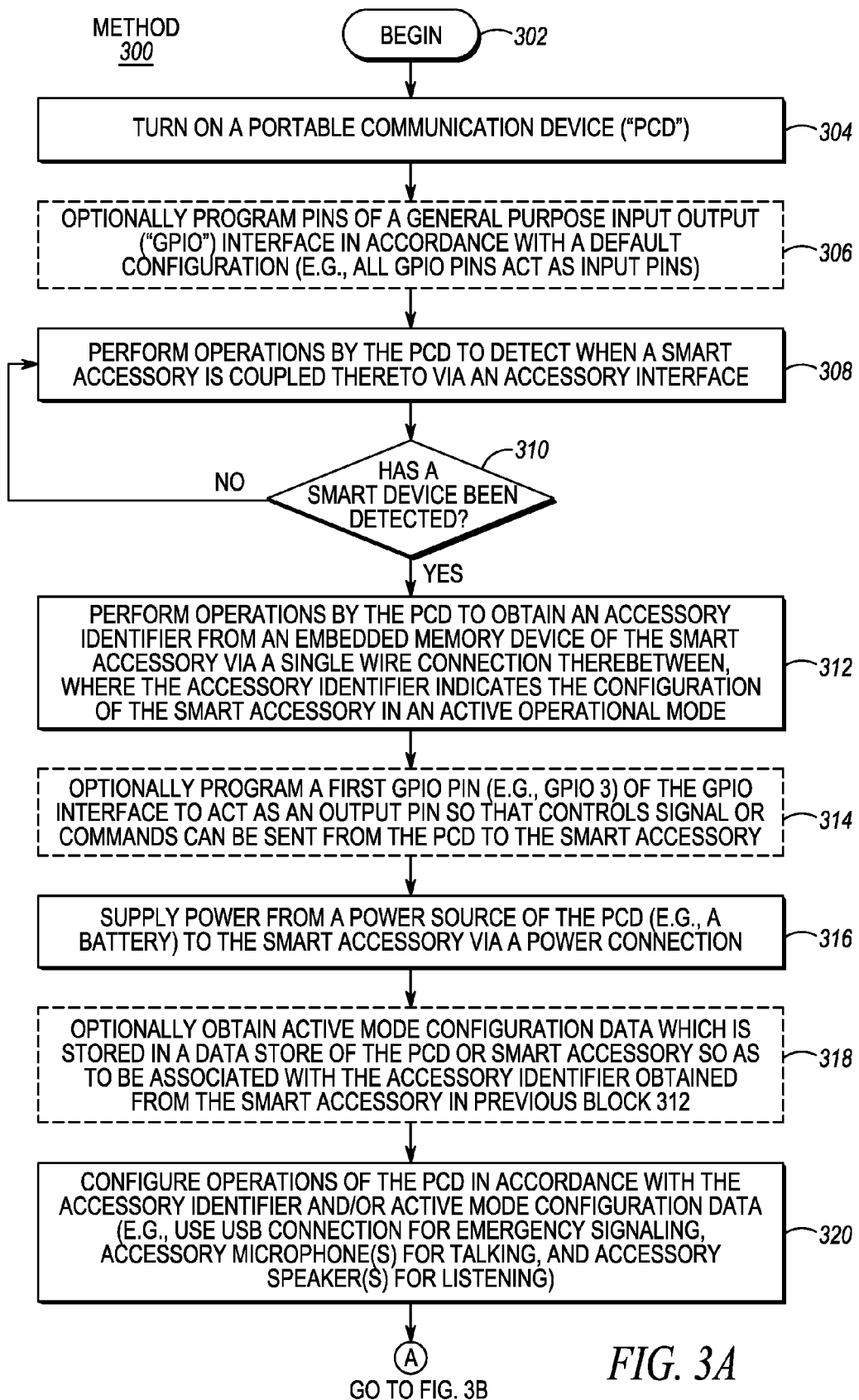
FIGS. 3A and 3B (collectively referred to herein as "FIG. 3") provide a flow diagram of an exemplary method for extending battery life of a portable communication device operating in conjunction with a smart accessory.
Figure 3B:
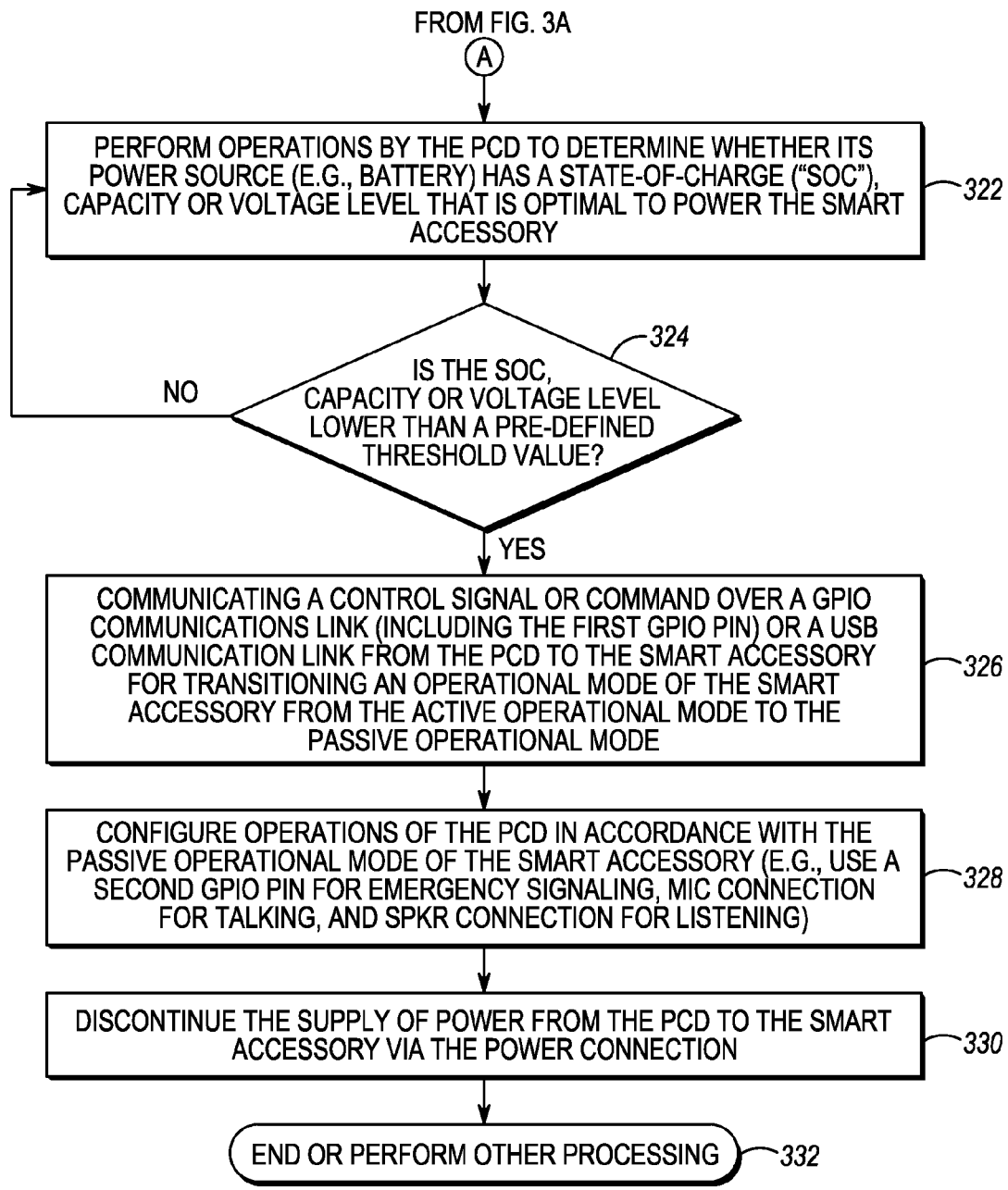

Referring now to FIGS. 3A and 3B, there is provided a flow diagram of an exemplary method 300 for extending battery life on a portable communication device (e.g., portable communication device 202 of FIG. 2) operating in conjunction with a smart accessory (e.g., smart accessory 250 of FIG. 2). Method 300 begins with block 302 and continues with block 304 where the portable communication device is turned on. In a next optional block 306, GPIO pins of a GPIO interface (e.g., GPIO interface 208 of FIG. 2) are programmed in accordance with a default configuration (e.g., all GPIO pins function as input pins).

The portable communication device then detects when the smart accessory is coupled thereto via an accessory interface, as shown by block 308. This detection can be achieved by forcing a particular GPIO pin (e.g., P0 of FIG. 2) to ground (e.g., via a detect GPIO connection of FIG. 2). When the smart accessory has not been detected [310:NO], then method 300 returns to block 308. In contrast, when the smart accessory has been detected [310:YES], then block 312 is performed where the portable communication device obtains an accessory identifier (e.g., accessory identifier 272 of FIG. 2) from an embedded memory device (e.g., embedded memory device 260 of FIG. 2) of the smart accessory via a signal wire connection (e.g., single wire connection 214 of FIG. 2). The accessory identifier provides the portable communication device with information regarding the configuration of the smart accessory when in an active operational mode. With this information, the portable communication device is able to transition from an active mode configuration to a passive mode configuration according to different power related decisions that will be discussed below. In this regard, the portable communication device uses the accessory identifier to determine what the configuration of the smart accessory will be when in a passive operational mode.

Next in optional block 314, a first GPIO pin (e.g., P3 of FIG. 2) is programmed to function as an output pin so that control signals and/or commands can be sent from the portable communication device to the smart accessory at a later time. In some scenarios, optional step 314 is not performed since an SB connection can be alternatively used for control and command. The portable communication device also supplies power to the smart accessory via a power connection (e.g., a VBus), as shown by block 316.

In cases where the accessory identifier simply indicates a particular type of smart accessory, optional block 318 may be performed. Block 318 involves performing operations by the portable communication device to obtain Active Mode Configuration Data ("AMCD"). The AMCD is stored in a data store of the portable communication device (e.g., data store 206 of FIG. 2) or a data store of the smart accessory (e.g., embedded memory device 260 of FIG. 2) so as to be associated with the accessory identifier obtained from the smart accessory in previous block 312.

After completing block 316 or 318, operations of the portable communication device are configured in accordance with the accessory identifier and/or AMCD, as shown by block 320. For example, the portable communication device is configured to use a SB connection (e.g., SB connection 226 of FIG. 2) for emergency signaling, as well as the microphone(s) (e.g., microphone(s) 264 of FIG. 2) and speaker(s) (e.g., speakers 262 of FIG. 2) of the accessory.

Upon completing block 320, method 300 continues with block 322 of FIG. 3B. In block 322, the portable communication device performs operations to determine whether its power source (e.g., power source 204 of FIG. 2) has an SOC, battery capacity or voltage level that is optimal to power the smart accessory. This determination may be achieved by comparing the SOC, capacity or voltage level to a pre-defined threshold value. The term "State-Of-Charge" or "SOC", as used herein, refers to a percentage of charge (e.g., 0%-100%). The term "capacity", as used herein, refers to a measure (e.g., Amps per hour) of the charge stored by a power source (e.g., a battery), and is determined by the mass of the active material contained in the power source.

When the SOC, capacity or voltage level is not lower than the pre-defined threshold value [324:NO], then method 300 returns to block 322. When the SOC, capacity or voltage level is lower than the pre-defined threshold value [324:YES], then method 300 continues with block 326. The pre-defined threshold value may be unique per type of smart accessory based on the smart accessory's load and peak currents, as discussed above. In some scenarios, the pre-defined threshold value is determined by considering the transmit current of the portable communication device. The peak current of the accessory is added to the transmit current of the portable communication device to obtain a combined peak current. If the combined peak current is lower than the pre-defined threshold value, then the system (e.g., system 200 of FIG. 2) might lose its' transmit capabilities or ultimately reset.

In block 326, a control signal or command is communicated over a GPIO communications link (including the first GPIO pin) or a SB communications link from the portable communication device to the smart accessory. The control signal or command causes the smart accessory's operational mode to transition from the active operational mode to the passive operational mode. In some scenarios, block 326 involves toggling the first GPIO pin which will flip internal switches in the smart accessory to transition its operational mode from the active operational mode to the passive operational mode.

Next in block 328, the portable communication device configures its operations in accordance with the passive operational mode of the smart accessory. For example, the portable communication device uses a second multipurpose connection (e.g., multipurpose connection 1 or 2 of FIG. 2) for emergency signaling, instead of the SB connection. This block may also involve transferring at least one accessory function to the portable communication device. The accessory function(s) include(s), but is(are) not limited to, audio processing, sensor handling and/or user interface operations.

In cases where the accessory identifier simply indicates a particular type of smart accessory, block 328 may further involve performing operations by the portable communication device to obtain Passive Mode Configuration Data ("PMCD"). The PMCD is stored in a data store of the portable communication device (e.g., data store 206 of FIG. 2) or a data store of the smart accessory (e.g., embedded memory device 260 of FIG. 2) so as to be associated with the accessory identifier obtained from the smart accessory in previous block 312. Thereafter, operations of the portable communication device are configured in accordance with PMCD.

After completing block 328, the supply of power from the portable communication device to the smart accessory is discontinued, as shown by block 330. Subsequently, block 332 is performed where method 300 ends or other processing is performed (e.g., return to a previous block).

Battery-Powered Accessory Scenarios

Figure 4:
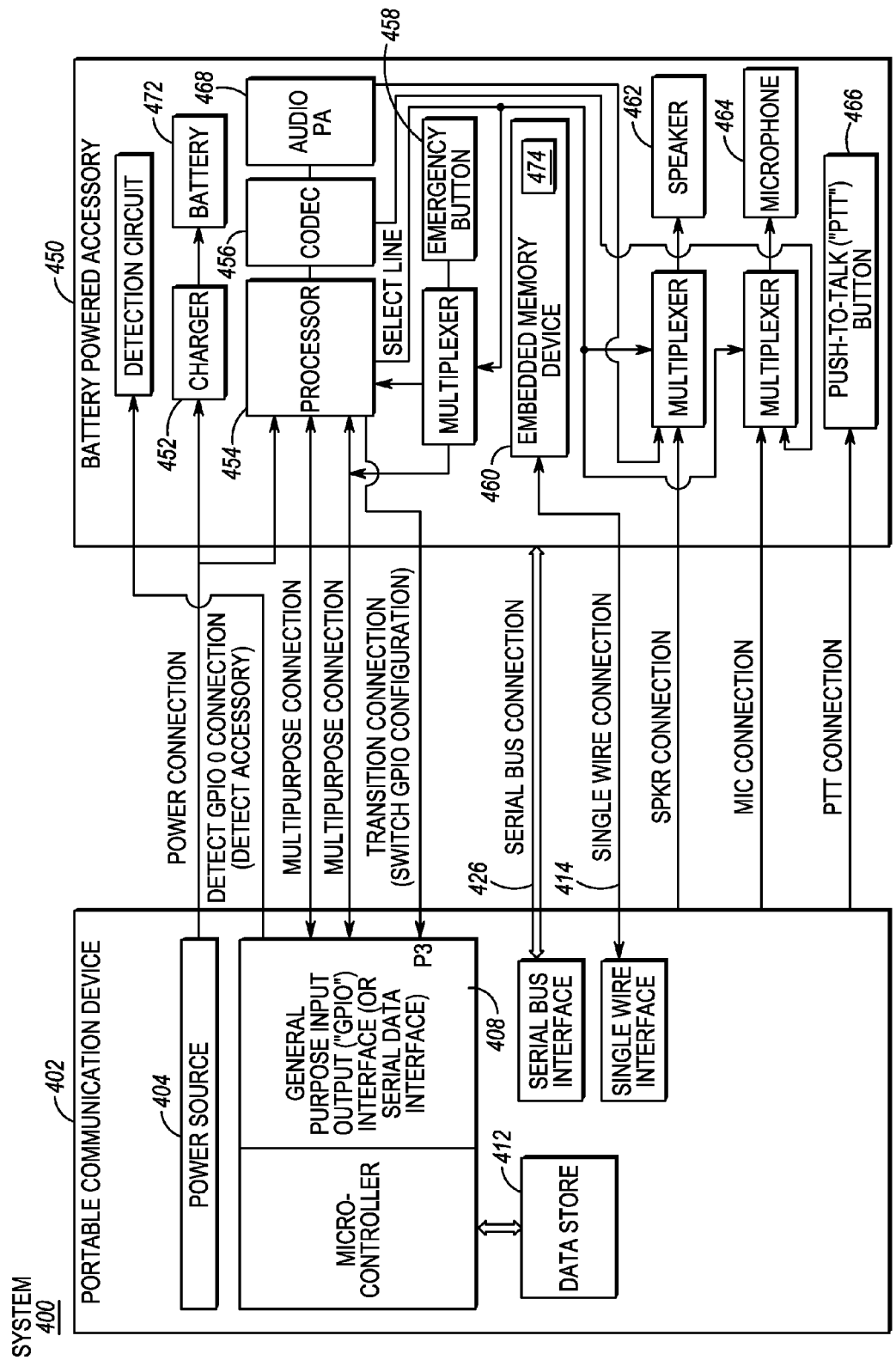
FIG. 4 is an illustration of an exemplary system including a portable communication device and a battery powered accessory.

Referring now to FIG. 4, there is provided a schematic illustration of an exemplary system 400. System 400 comprises a portable communication device 402 and a battery powered accessory 450. Portable communication device 402 can be the same as or similar to portable communication device 102 of FIG. 1. As such, the discussion provided above in relation to portable communication device 102 is sufficient for understanding certain operations of device 402. Device 402 will be described in more detail below.

The battery powered accessory 450 does not require the portable communication device to provide power to its electronic components 452 through 468. The battery powered accessory 450 runs as a standalone device with collaborative device functions (e.g., touchscreen, camera, sensors, etc.). When the SOC, charge or voltage level of the battery 472 is above a first pre-defined threshold level, the battery powered accessory 450 operates in a battery powered operational mode. In the battery powered operational mode, the battery powered accessory 450 functions as a collaborative device with no battery charging. Also, mission critical communications are achieved via a SB connection 426.

When the SOC, charge or voltage level of the battery 472 is below the first pre-defined threshold level and above a second pre-defined threshold level, the battery powered accessory 450 operates in a simple battery powered operational mode. In the simple battery powered operational mode, the battery powered accessory 450 requests re-charging of its battery 472 by a power source 404 of the portable communication device 402. If the power source's SOC, capacity or voltage level is above a pre-defined fourth threshold level, the portable communication device 402 will grant battery charging capabilities through a power connection. Also, the battery powered accessory 450 routes mission critical functions (e.g., audio, PTT and emergency functions) directly to the GPIO interface 408 of the portable communication device 402 via a multipurpose connection 1 or 2. As such, the operator of system 400 is able to talk, listen and issue emergency signals with the battery powered device despite its battery 472 being depleted. The battery powered accessory 450 may also hand over certain processing tasks to the portable communication device 402 (e.g., audio/video processing, sensor handling, display processing, etc.).

When the charge of the battery 472 is below the second pre-defined threshold level, the battery powered accessory 450 operates in a passive battery powered operational mode. In the passive battery powered operational mode, the battery powered accessory 450 routes mission critical functions (e.g., audio, PTT and emergency functions) directly to the GPIO interface 408 of the portable communication device 402. As such, the operator of system 400 is able to talk, listen and issue emergency signals with the battery powered device despite its battery 472 being depleted, removed or not present.

When the charge of battery 472 reaches a level above the first pre-defined threshold level, the battery powered accessory 450 once again operates in its battery powered operational mode, thereby regaining all of its features (e.g., touch screen, camera, wireless communication, etc.). At this point, the battery charging could continue or discontinue based on the battery's capacity.

The transition from the battery powered operational mode to the simple battery powered operational mode is outlined by the following TABLE 2.

TABLE 2

| Smart Accessory's Mission Critical Functions In Battery Powered Operational Mode | Transition To | Smart Accessory's Mission Critical Functions In Simple Battery Powered Operational Mode |
|---|---|---|
| Talk → Microphone(s) P/N | ⇒ | Talk → Microphone(s) P/N |
| Listen → Speaker(s) P/N | | Listen → Speaker(s) P/N |
| Emergency → SB Connection | | Emergency → GPIO Connection |

In some scenarios, an operator can disable the mode transitioning via a menu of the portable communication device. Also, removal of the battery 472 may force the transition from the battery powered operational mode to the simple battery powered operational mode.

Referring now to FIGS. 5A through 5D, there is provided a flow diagram of an exemplary method 500 for extending battery life on a portable communication device (e.g., portable communication device 402 of FIG. 4) operating in conjunction with a battery powered accessory (e.g., battery powered accessory 450 of FIG. 4). Method 500 begins with block 502 and continues with block 504 where the portable communication device is turned on. In a next optional block 506, GPIO pins of a GPIO interface (e.g., GPIO interface 408 of FIG. 4) are programmed in accordance with a default configuration (e.g., all GPIO pins function as input pins).

The portable communication device then detects when the battery powered accessory is coupled thereto via an accessory interface, as shown by block 508. This detection can be achieved by forcing a particular GPIO pin to ground (e.g., via a detect GPIO connection of FIG. 4). When the battery powered accessory has not been detected, then method 500 returns to block 508. In contrast, when the battery powered accessory has been detected, then block 512 is performed where the portable communication device obtains an accessory identifier (e.g., accessory identifier 474 of FIG. 4) from an embedded memory device (e.g., embedded memory device 460 of FIG. 4) of the battery powered accessory via a signal wire connection (e.g., single wire connection 414 of FIG. 4). The accessory identifier provides the portable communication device with information regarding the configuration of the battery powered accessory when in a battery powered operational mode. With this information, the portable communication device is able to transition from a battery powered mode configuration to a simple battery powered mode configuration (and vice versa) according to different power related decisions that will be discussed below. In this regard, the portable communication device used the accessory identifier to determine what the configuration of the battery powered accessory will be when in a simple battery powered operational mode.

Next in optional block 514, a first GPIO pin (e.g., P3 of FIG. 4) is programmed to function as an output pin so that control signals and/or commands can be sent from the portable communication device to the battery powered accessory at a later time. In some scenarios, optional step 514 is not performed since an SB connection can be alternatively used for control and command. Thereafter, the battery powered accessory performs operations to determine whether its power source (e.g., battery 472 of FIG. 4) needs to be charged, as shown by block 516. This determination can be made by comparing power source's SOC, capacity or voltage level to a pre-defined threshold value. In some scenarios, a determination is made that the battery powered accessory's power source needs to be recharged when the SOC, capacity or voltage level is below a threshold value. When the battery powered accessory does not need to be charged [518:NO], method 500 returns to block 516. When the power source of the battery powered accessory does need to be charged [518:YES], then method 500 continues with block 524 of FIG. 5B where operations are performed by the battery powered accessory to request a charging voltage from the portable communication device. The request can be sent using a SB connection (e.g., SB connection 426 of FIG. 4).

At this time, the portable communication device evaluates whether its power source (e.g., power source 404 of FIG. 4) has an SOC, capacity or voltage level that is optimal for charging the battery of the battery powered device, as shown by block 526. This evaluation can involve comparing the SOC, capacity or voltage level to a pre-defined threshold value.

When the power source's SOC, capacity or voltage level is lower than a pre-defined threshold value [528:YES], then block 530 is performed where the portable communication device supplies power to the battery powered accessory via a power connection. Next, block 532 is performed which will be described below. When the power source's SOC, capacity or voltage level is greater than a pre-defined threshold value [528:NO], then block 532 is performed where the battery accessory determines whether its battery has reached the lowest voltage at which it can fully operate. When the battery has not reached its lowest voltage level at which the battery powered accessory can fully operate [534:NO], then method 500 returns to block 516 of FIG. 5A, as shown by block 536. In contrast, when the battery has reached its lowest voltage level at which the battery powered accessory can fully operate [534:YES], then method 500 continues with block 538 of FIG. 5C.

Figure 5A:
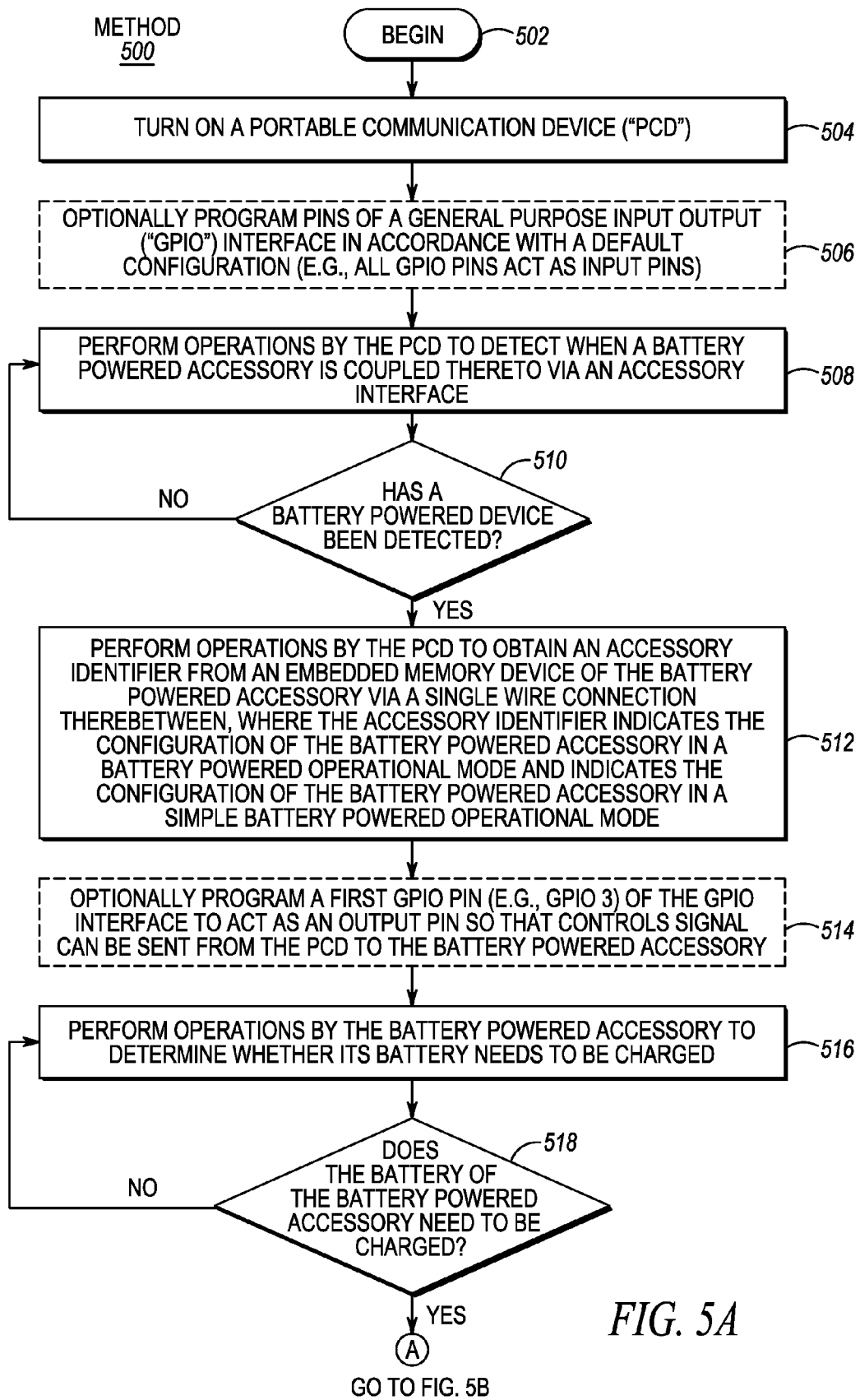
FIGS. 5A through 5D (collectively referred to herein as "FIG. 5") provide a flow diagram of an exemplary method for extending battery life of a portable communication device operating in conjunction with a battery powered accessory.
Figure 5B:
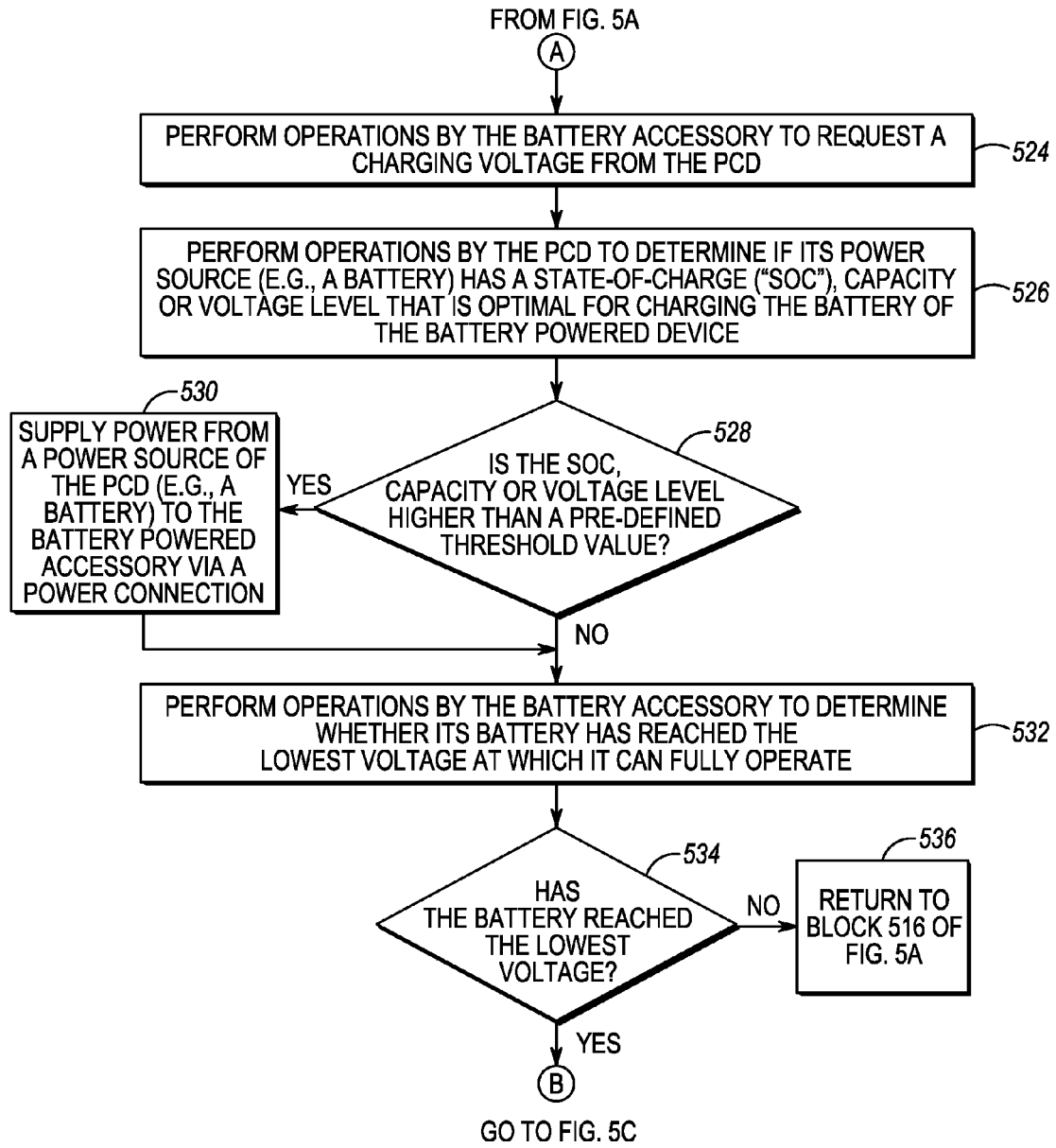
Figure 5C:
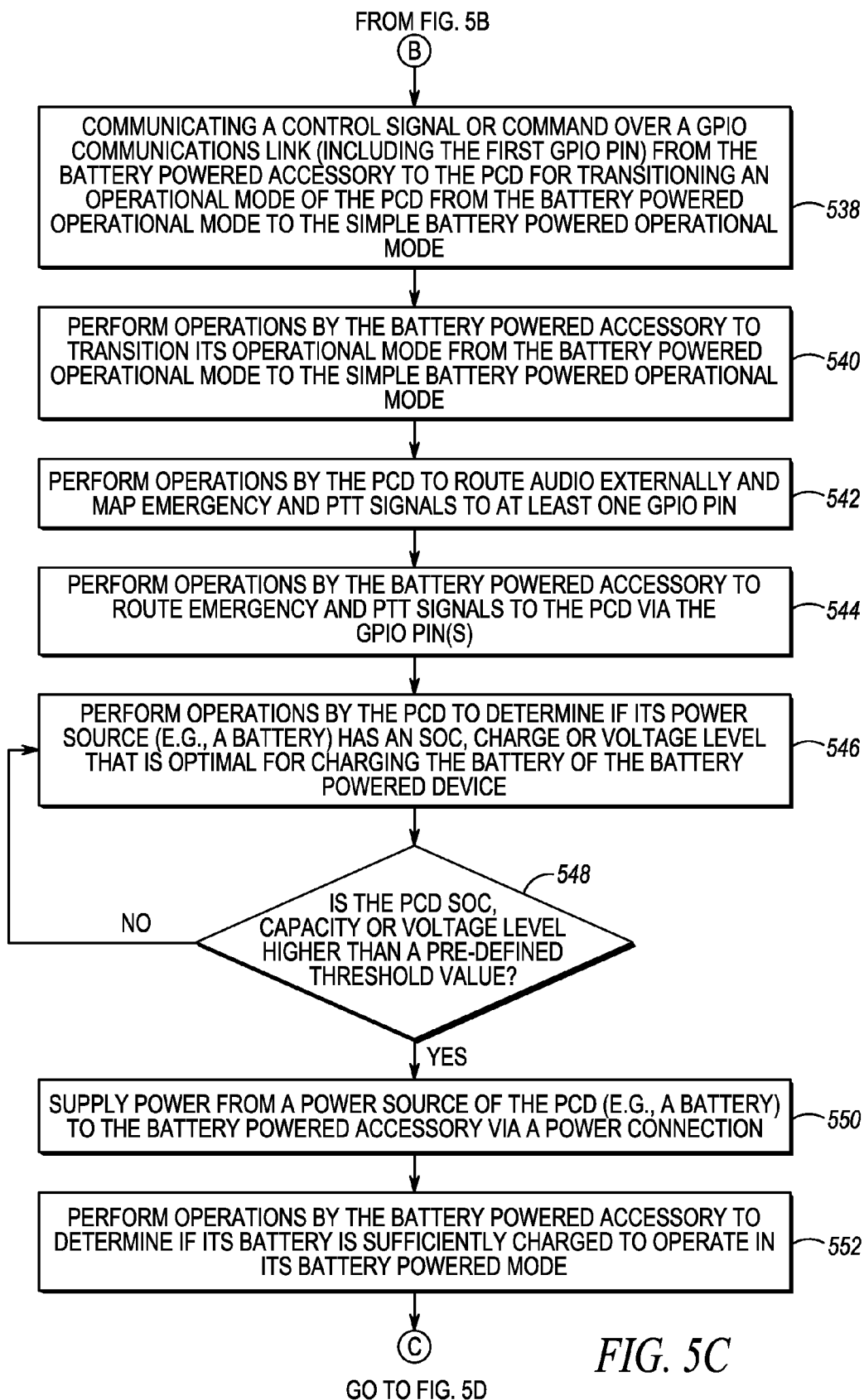
Figure 5D:
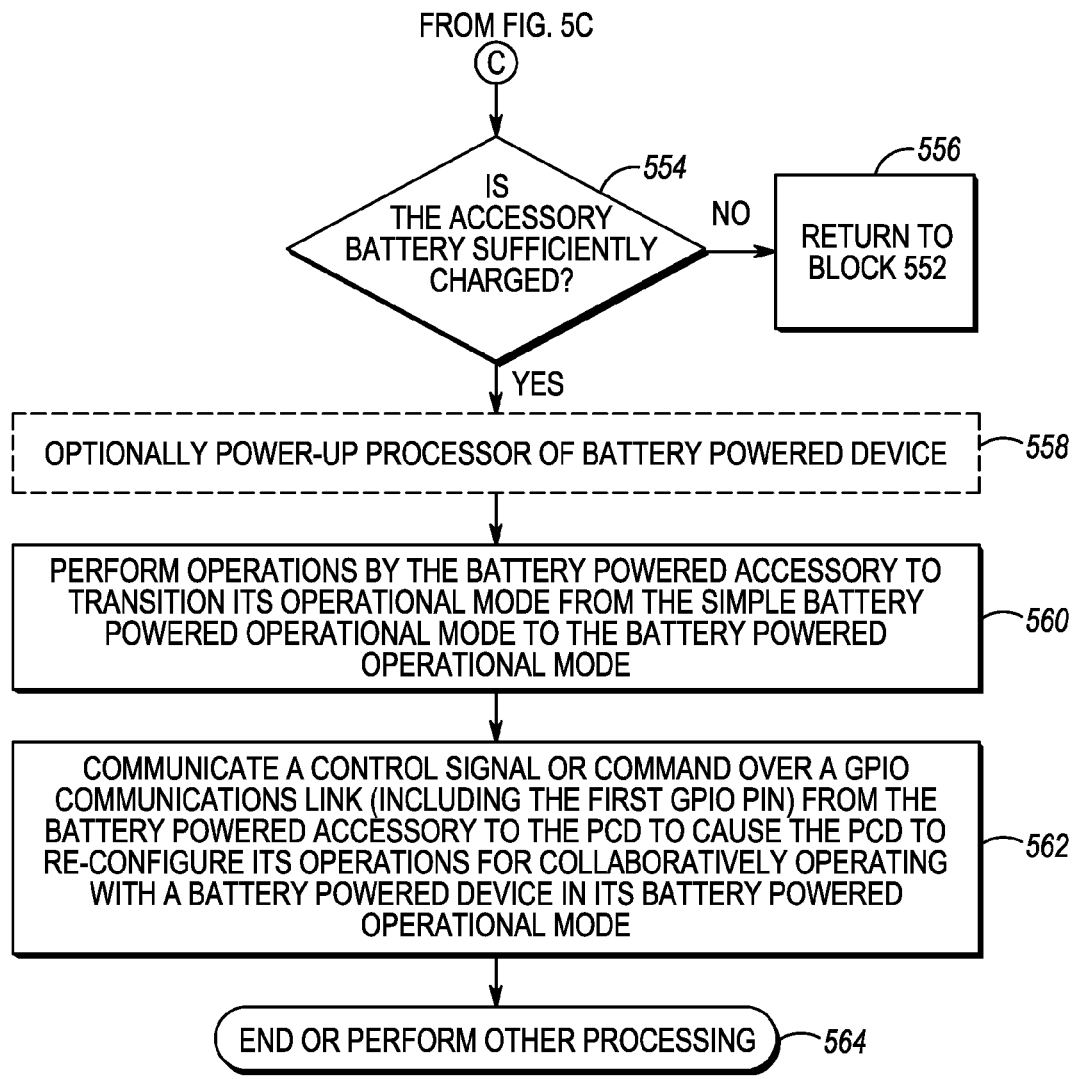

Block 538 of FIG. 5C involves communicating a control signal or command over a GPIO communications link (including the first GPIO pin) from the battery powered accessory to the portable communication device for transitioning an operational mode of the portable communication device from the battery powered operational mode to the simple battery powered operational mode. In some scenarios, block 538 involves toggling the first GPIO pin which will indicate to the portable communication device to transition to the simple battery powered mode configuration. This can be accomplished through an external pull resistor in case the processor (e.g., processor 454 of FIG. 4) is not powered to drive the GPIO (e.g., GPIO 408 of FIG. 4).

The battery powered accessory also performs operations in block 540 to transition its operational mode from the battery powered operational mode to the simple battery powered operational mode. Block 540 can involve toggling a control signal that will transition the battery powered accessory to be configured as a simple battery powered accessory. This is the default state when the battery powered accessory is not powered.

At this point, the portable communication device is configured to collaboratively operate with a simple battery powered accessory. As such, the portable communication device routes audio externally and maps emergency/PTT signals to at least one GPIO pin, as shown by block 542. In turn, the battery powered accessory routes emergency/PTT signals to the portable communication device via the GPIO pin(s), as shown by block 544.

In a next block 546, the portable communication device determines if its power source has an SOC, charge or voltage level that is optimal for charging the battery of the battery powered device. This determination can be made by comparing the SOC, charge or voltage level to a pre-defined threshold value. When the SOC, capacity or voltage level is lower than a pre-defined threshold value [548:NO], method 500 returns to block 546. When the SOC, capacity or voltage level is higher than the pre-defined threshold value [548: YES], then block 550 is performed where power is supplied from the power source of the portable communication device to the battery powered accessory via a power connection.

Next, the battery powered accessory assesses its power source's SOC, charge or voltage level in block 552, i.e., the battery powered device determines whether its battery is sufficiently charged to operate in its battery powered mode. When the battery is not sufficiently charged [554:NO], then block 556 is performed where method 500 returns to block 552 of FIG. 5C. When the battery is sufficiently charged [554:YES], then optional block 558 is performed where the processor (e.g., processor 454 of FIG. 4) is supplied power. The battery powered device also performs operations in block 560 to transition its operational mode from the simple battery powered operational mode to the battery powered operational mode. Such operations can include, but are not limited to, toggling a control signal that will cause the battered powered accessory to transition to its battery powered mode. A control signal or command is also communicated in block 562 from the battery powered accessory to the portable communication device for causing the portable communication device to re-configure itself for collaboratively operating with a battery powered device in its battery powered mode. The control signal or command can be communicated over a GPIO communications link including the first GPIO pin. Subsequently, block 564 is performed where method 500 ends or other processing is performed (e.g., return to a previous block).

Notably, the following functionalities of the battery powered device may be maintained when transitioning to the simple battery powered operational mode: an equalization profile; sensor detection; and user interface functions. With regard to the equalization profile, the battery powered device may maintain the same profile. Besides cutting power when transitioning from the battery powered operational mode to the simple battery powered operational mode, the portable communication device can also switch to an optimal equalization profile for the particular type of simple battery powered accessory in use. For example, the battery powered accessory handles audio equalization and microphone tuning parameters for the speakers and microphones through internal processing. Once a transition occurs (audio is routed directly to the portable communication device), the portable communication device switches to a different equalization profile matching (or resembling) the profile used by the battery powered accessory. The portable communication device may determine the type of equalization profile by passing the parameters with the battery powered accessory before the transition through a serial bus or by reading an accessory identifier from an embedded memory device of the battery powered accessory. This will allow the battery powered accessory (operating in its simple battery powered operational mode) to maintain an optimal audio performance even in a powerless case.

Figure 6:
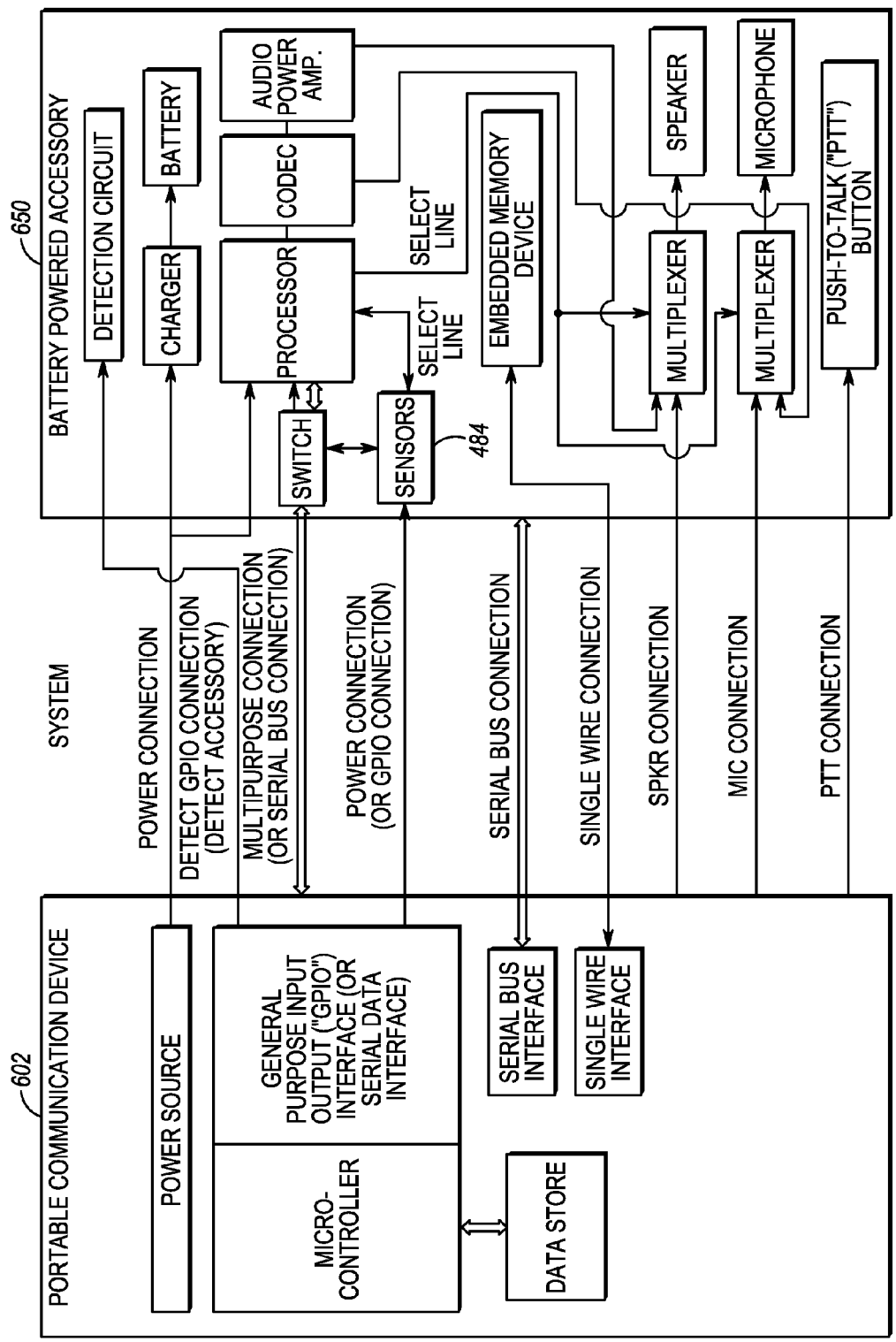
FIGS. 6 and 7 each provide an illustration of an exemplary system including a portable communication device and battery powered accessory.

With regard to sensor detection, the portable communication device may take control of the battery powered accessory's sensors. For example, a battery powered accessory 650 of FIG. 6 is running out of charge and a transition to the simple battery powered operational mode is about to occur. As part of the transition process, the battery powered accessory 650 may: route sensing information to a portable communication device 602 via a serial bus; communicate to the portable communication device 602 to take over handling of the accessory's sensors 484 (this may involve configuration changes on the portable communication device's sensor processor); and communicate to the portable communication device 602 to power only the accessory's main sensors (e.g., very low consumption integrated circuits) with either a power connection or a GPIO connection. This will allow the battery powered accessory 650 to keep sensing activities even in a powerless case. The sensors 484 can include, but are not limited to, accelerometers, gyroscopes, and proximity sensors.

Figure 7:
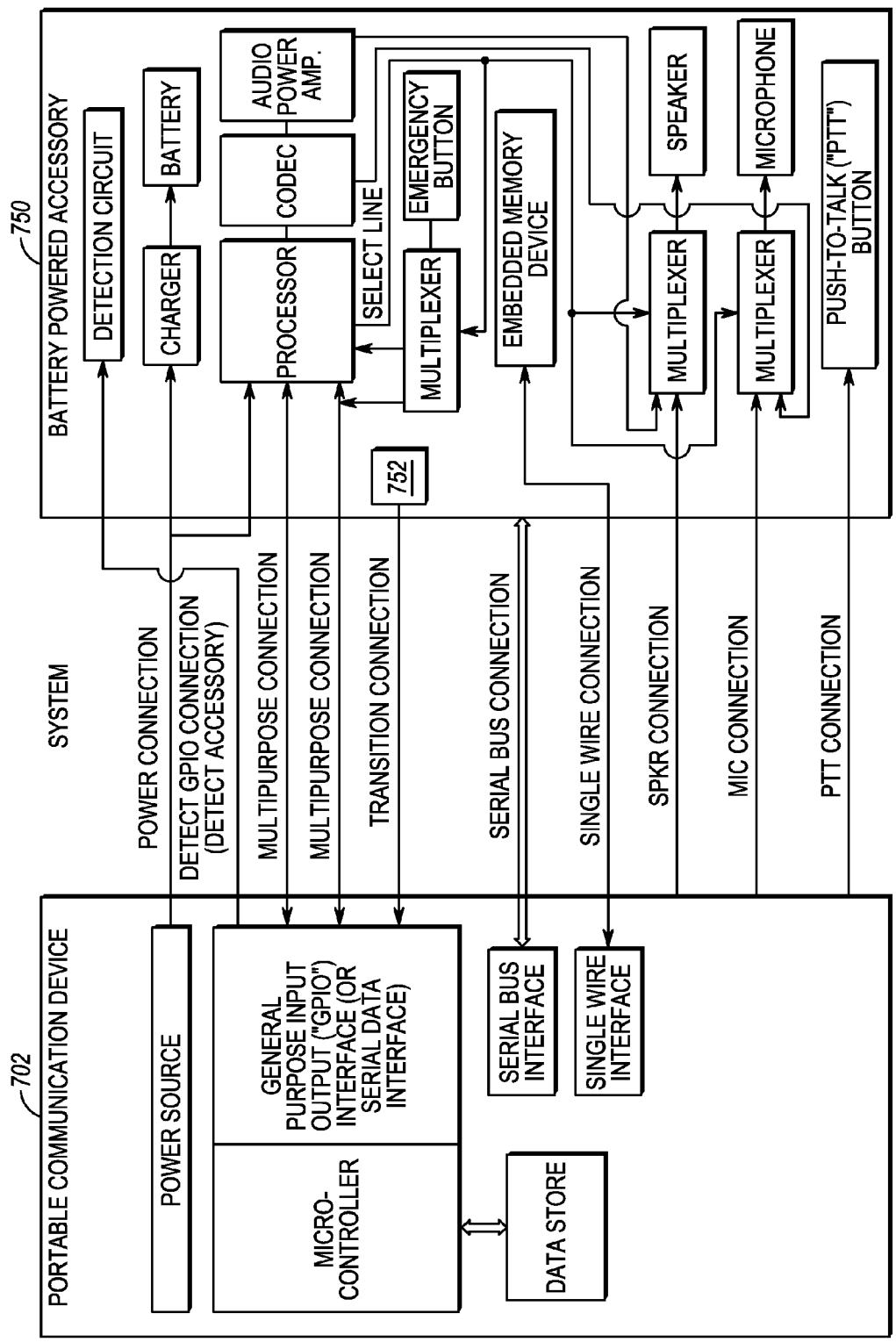

With regard to the user interface functions, the portable communication device can take control over certain input device or output devices. For example, a battery powered accessory 750 of FIG. 7 requests that the portable communication device 702 provide power to user interface components 752 which require a relatively low amount for operation. The user interface components 752 can include, but are not limited to, LEDs and a display. The user interface components 752 can be used to output information indicating the current operational mode of the battery powered accessory.

As evident from the above discussion, the disclosure provides a novel way of achieving major power savings while maintaining mission critical functionality. The present idea manages portable communication device battery power while prioritizing mission critical features of an accessory. For example, on a smart accessory, the operator is able to access main mission critical features (e.g., talk, listen and emergency signaling) for a longer period of time when the capacity of the portable communication device's power source is low. On a battery powered accessory, the operator will be able to maintain mission critical capabilities when the accessory's battery is completely depleted or non-existent. In the case when the portable communication device's power source is deemed optimal for changing the accessory's battery, the operator is able to maintain mission critical capabilities while the portable communication device charges the accessory's battery.

Additionally, the disclosure provides a novel solution in which: audio processing and equalization is handed over to the portable communication device when a battery powered accessory is in its simple battery powered operational mode and while the accessory's speaker is still being used; microphone tuning parameters are handled by the portable communication device while the accessory's microphone is still being used; certain user interface functions of the accessory are controlled by the portable communication device when the battery powered accessory is in its simple battery powered operational mode; the battery powered accessory's sensors are controlled by the portable communication device when the battery powered accessory is in its simple battery powered operational mode; power is provided to the battery powered accessory while it transitions to its simple battery powered operational mode; a smart accessory is operated in its passive operational mode for mission critical operations based on the portable communication device's power source's capacity limitations; an operator is able to enable and disable mode transitions by the accessory via a user-software interaction with the portable communication device and/or accessory; and the battery life is extended for a portable communication device operating in collaboration with an accessory. Additionally, a smart accessory is able to transition to a passive operational mode and handover certain tasks to the portable communication device. These tasks include, but are not limited to, audio processing, equalization tasks, microphone tuning parameters, user interface features, and/or sensor handling.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and Field Programmable Gate Arrays ("FPGAs") and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more Application Specific Integrated Circuits ("ASICs"), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a Read Only Memory ("ROM"), a Programmable Read Only Memory ("PROM"), an Erasable Programmable Read Only Memory ("EPROM"), an Electrically Erasable Programmable Read Only Memory ("EEPROM") and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for extending battery life on a communication device, comprising:
   configuring operations of the communication device such that the communication device operates in conjunction with an accessory operating in a first operational mode in which the accessory has a first amount of functionality;
   detecting a trigger event which occurs when (a) a power source of the communication device has a State-Of-Charge ("SOC"), capacity or voltage level that is outside a predetermined optimal level for powering the accessory, (b) a voltage level of the accessory's power source is below a lowest voltage level at which the accessory can fully operate, or (c) a power source of the accessory has an SOC, capacity or voltage level above a predetermined level or value that is sufficient for enabling the accessory to once again operate in a second operational mode; and
   in response to the trigger event, automatically re-configuring operations of the communication device and the accessory such that the communication device operates in conjunction with the accessory operating in the second operational mode in which the accessory has a second amount of functionality different from the first amount of functionality.

2. The method according to claim 1, wherein the first operational mode is a mode in which the accessory is fully functional and the second operational mode is a mode in which the accessory has limited functionality.

3. The method according to claim 2, wherein the accessory maintains talk, listen and emergency capabilities when in the second operational mode without being powered by the communication device or with a power source that is depleted or has been removed from the accessory.

4. The method according to claim 1, wherein the first operational mode is a mode in which the accessory has limited functionality and the second operational mode is a mode in which the accessory is fully functional.

5. The method according to claim 1, further comprising transferring at least one accessory function or processing task to the communication device during said re-configuring.

6. The method according to claim 5, wherein the accessory function or processing task comprises audio equalization, microphone tuning, audio processing, video processing, sensor handling, and user interface processing.

7. The method according to claim 1, further comprising:
   supplying power from the communication device to the accessory prior to said re-configuring; and
   discontinuing the supply of power to the accessory subsequent to said re-configuring.

8. The method according to claim 1, further comprising performing operations by the communication device to re-charge the accessory's power source when
   the voltage level of the accessory's power source is below the lowest voltage level at which the accessory can fully operate, and
   the power source of the communication device has an SOC, capacity or voltage level that is above a predefined threshold value.

9. The method according to claim 1, further comprising supplying power from the communication device to select ones of a plurality of electronic components of the accessory when the accessory is operating in the second operational mode.

10. The method according to claim 1, wherein the accessory routes at least one mission critical function to a serial bus interface of the communication device with operating in the first operational mode and to a General Purpose Input Output ("GPIO") interface of the communication device with operating in the second operational mode.

11. A system, comprising:
    an accessory operating in a first operational mode in which the accessory has a first amount of functionality;
    a communication device operating in conjunction with the accessory; and
    at least one electronic circuit configured to
       detect a trigger event which occurs when (a) a power source of the communication device has a State-Of-Charge ("SOC"), capacity or voltage level that is operating outside an optimal level for powering the accessory, (b) a voltage level of the accessory's power source is below a lowest voltage level at which the accessory can fully operate, or (c) a power source of the accessory has an SOC, capacity or voltage level above a predetermined level or value that is sufficient for enabling the accessory to once again operate in a second operational mode, and
       automatically cause operations of the communication device and the accessory to be re-configured in response to the trigger event, such that the communication device operates in conjunction with the accessory operating in the second operational mode in which the accessory has a second amount of functionality different from the first amount of functionality.

12. The system according to claim 11, wherein the first operational mode is a mode in which the accessory is fully functional and the second operational mode is a mode in which the accessory has limited functionality.

13. The system according to claim 12, wherein the accessory maintains talk, listen and emergency capabilities when in the second operational mode without being powered by the communication device or with a power source that is depleted or has been removed from the accessory.

14. The system according to claim 11, wherein the first operational mode is a mode in which the accessory has limited functionality and the second operational mode is a mode in which the accessory is fully functional.

15. The system according to claim 11, wherein at least one accessory function or processing task is transferred to the communication device when operations of the communication device and the accessory are re-configured.

16. The system according to claim 15, wherein the accessory function or processing task comprises audio equalization, microphone tuning, audio processing, video processing, sensor handling, and user interface processing.

17. The system according to claim 11, wherein power is supplied from the communication device to the accessory prior to when operations of the communication device and the accessory are re-configured, and discontinued subsequent to when operations of the communication device and the accessory are re-configured.

18. The system according to claim 11, wherein the communication device re-charges the accessory's power source when
   the voltage level of the accessory's power source is below the lowest voltage level at which the accessory can fully operate, and
   the power source of the communication device has an SOC, capacity or voltage level that is above a predefined threshold value.

19. The system according to claim 11, wherein the communication device supplies power to select ones of a plurality of electronic components of the accessory when the accessory is operating in the second operational mode.

20. The system according to claim 11, wherein the accessory routes at least one mission critical function to a serial bus interface of the communication device with operating in the first operational mode and to a General Purpose Input Output ("GPIO") interface of the communication device with operating in the second operational mode.

* * * * *